US008639958B2

(12) United States Patent
Belluomini et al.

(10) Patent No.: US 8,639,958 B2
(45) Date of Patent: Jan. 28, 2014

(54) ON-DEMAND STORAGE SYSTEM ENERGY SAVINGS

(75) Inventors: Wendy A Belluomini, San Jose, CA (US); David D Chambliss, San Jose, CA (US); Joseph S. Glider, San Jose, CA (US); Himabindu Pucha, San Jose, CA (US); Rui Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/178,027

(22) Filed: Jul. 7, 2011

(65) Prior Publication Data

US 2013/0013941 A1    Jan. 10, 2013

(51) Int. Cl.
*G06F 1/26*    (2006.01)

(52) U.S. Cl.
USPC .......................................... 713/323; 713/300

(58) Field of Classification Search
USPC ........................................................ 713/323
See application file for complete search history.

(56) References Cited

U.S. PATENT DOCUMENTS

| 6,961,815 | B2 | 11/2005 | Kistler et al. | |
|---|---|---|---|---|
| 2005/0210304 | A1 | 9/2005 | Hartung et al. | |
| 2007/0101173 | A1* | 5/2007 | Fung | 713/300 |
| 2009/0006877 | A1* | 1/2009 | Lubbers et al. | 713/323 |
| 2009/0198385 | A1* | 8/2009 | Oe et al. | 700/296 |
| 2010/0313044 | A1* | 12/2010 | Rajpal et al. | 713/320 |
| 2010/0318824 | A1* | 12/2010 | Tinker | 713/323 |
| 2010/0332872 | A1* | 12/2010 | Hanson et al. | 713/320 |
| 2011/0060927 | A1* | 3/2011 | Fillingim et al. | 713/320 |
| 2011/0239013 | A1* | 9/2011 | Muller | 713/320 |

OTHER PUBLICATIONS

Chambliss et al., "Performance Virtualization for Large-Scale Storage Systems," Proceedings of the 22nd International Symposium on Reliable Systems, 2003.
Verma et al., "BrownMap: Enforcing Power Budget in Shared Data Centers," IBM Research Report, Dec. 2009.
Chen et al., "Leveraging Disk Drive Acoustic Modes for Power Management," IEEE 2010.
Allalouf et al., "Storage Modeling for Power Estimation," SYSTOR '09, May 4-6, 2009.

* cited by examiner

*Primary Examiner* — Thomas Lee
*Assistant Examiner* — Robert Cassity
(74) *Attorney, Agent, or Firm* — Lieberman & Brandsdorfer, LLC

(57) ABSTRACT

Embodiments of the invention relate to dynamic power management of storage volumes and disk arrays in a storage subsystem to mitigate loss of performance resulting from the power management. The volumes and arrays are prioritized, and in real-time power is selectively reduced in response to both the prioritization and an energy savings goal. A feedback loop is provided to dynamically measure associated power gain based upon a lowering of power consumption, and device selection may be adjusted based upon received feedback.

13 Claims, 8 Drawing Sheets

ON-DEMAND STORAGE SYSTEM ENERGY SAVINGS

BACKGROUND

This invention relates to on-demand power reduction with a storage subsystem of a data site. More specifically, the invention relates to power management of storage elements within the data center that minimizes loss of performance with respect to data access.

Cloud computing is a model of service delivery for enabling convenient, on-demand network access to a shared pool of configurable computer resources, e.g. networks, network bandwidth, servers, processing, memory, storage, applications, virtual machines, and services, that can be rapidly provisioned and released with minimal management effort or interaction with a provider of service. One of the characteristics of cloud computing infrastructure is that applications can be launched from a plurality of locations with each location referred to herein as a data site. Executing applications and processing data responsive to the application execution consumes power, which in some circumstances needs to be regulated. Power reduction may occur on a periodic or temporary basis. A periodic basis pertains to power reduction coming at a set frequency, and a temporary basis pertains to a reduction that is not on a set frequency. Power reduction of a data site may be required for circumstances external to power delivery. For example, power reduction may be necessary due to failure of an external cooling mechanism. In one embodiment, periodic power reductions can be accounted for with greater precision than temporary power reductions. One common element with respect to power consumption is the need to maintain a level of performance that allows for uninterrupted data processing and access to computer resources.

For each category of power reduction, there is a need to balance power allocation and performance of applications and associated data processing. In one embodiment, the aspect of balancing may mean that the power reduction target is reached, while minimizing performance loss on data access to the storage system(s). Accordingly, balancing power in a computing environment is challenging.

BRIEF SUMMARY

This invention comprises a system, and article for creation of consistent data within an on-demand network accessible environment with a shared pool of configurable computing resources.

In one aspect, a system is provided with a storage subsystem of a data center having multiple storage devices, including at least one storage volumes and at least one disk array, with the devices organized in a hierarchy. A functional unit is provided in communication with the storage subsystem. The functional unit includes tools to support dynamic power management of the storage devices. More specifically, the functional unit includes a storage device manager, a data access manager, and a power manager. The storage device manager monitors and reports power consumption of the storage devices. The data access manager, which is in communication with the storage device manager, monitors and reports data access performance with respect to each of the storage devices. In addition, the data access manager stores policies pertaining to the storage devices. The power manager, which is in communication with the storage device and data access managers, employs a set of heuristics to receive the report(s) from the storage device and data access managers and lowers power usage of one or more storage device in response to a power limit request while maintaining performance in compliance with the storage policies. In one embodiment, the heuristics operate in real-time. More specifically, a first of the heuristics selects a device in the hierarchy based upon a priority setting, and lowers a power consumption setting thereof. A second of the heuristics measures feedback pertaining to the power consumption after the adjustment by the first heuristic is complete. An adjustment of device selection may be implemented based upon the measured feedback.

In a further aspect, a computer program product is provided for use with a storage subsystem of a data center. The storage subsystem includes multiple storage devices, including one or more volumes and one or more disk arrays, organized in a hierarchy. The computer program product comprises a computer readable storage medium having computer readable program code embodied therewith. Computer readable program code is provided to monitor and report power consumption of the storage devices, and to monitor and report data access performance on each of the storage devices. In one embodiment, the program code stores policies associated with the storage devices. Program code is provides to respond to a request to limit power associated with the storage devices. More specifically, the program code receive the report(s) and employs a set of real-time heuristics to lower power usage of at least one storage device in the subsystem while maintaining performance of the subsystem based upon the stored policies. A first heuristic selects a device within the hierarchy, based upon a priority setting, and lowers a power consumption setting for the selected device. A second heuristic measures power consumption feedback after lowering the power consumption of the selected device. The selection of devices may be adjusted based upon the measured feedback.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
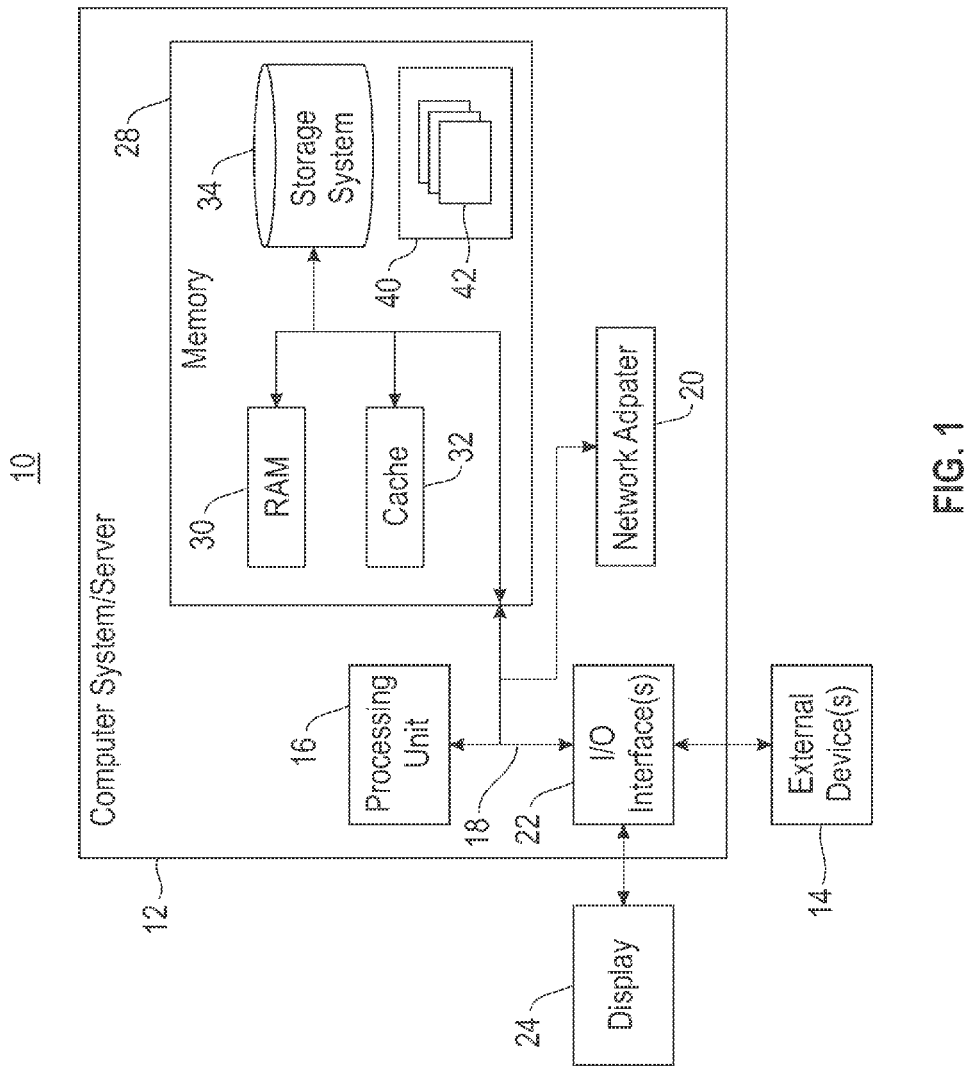
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus and system of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
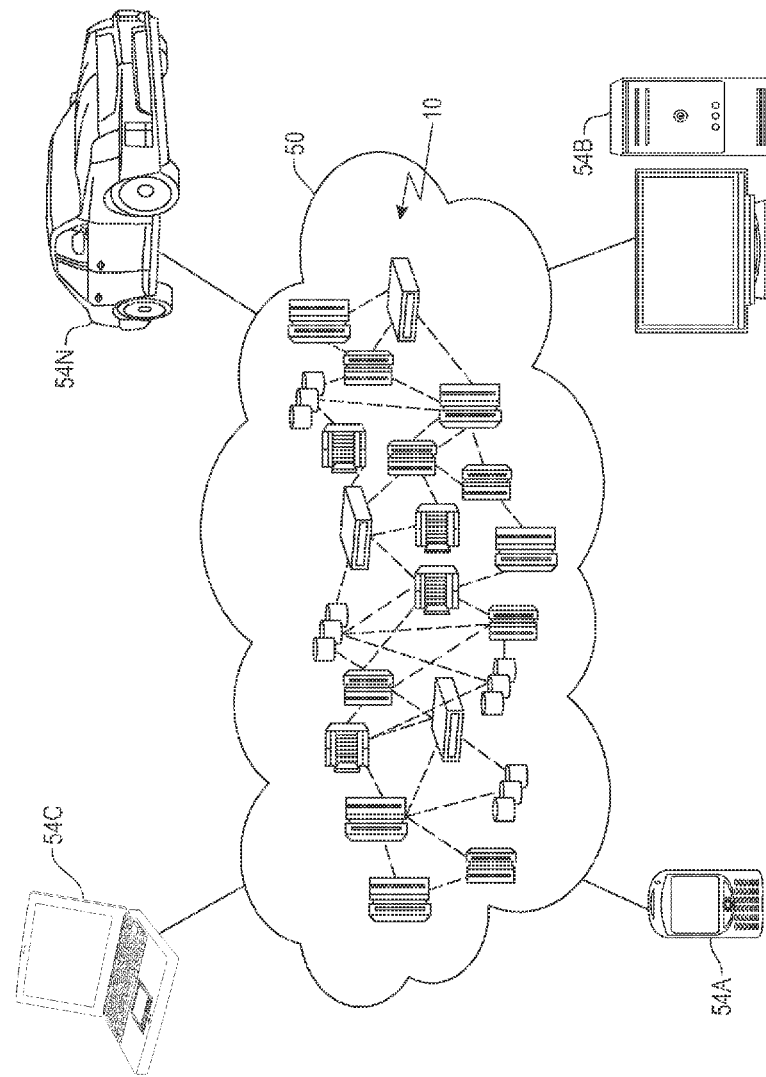
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
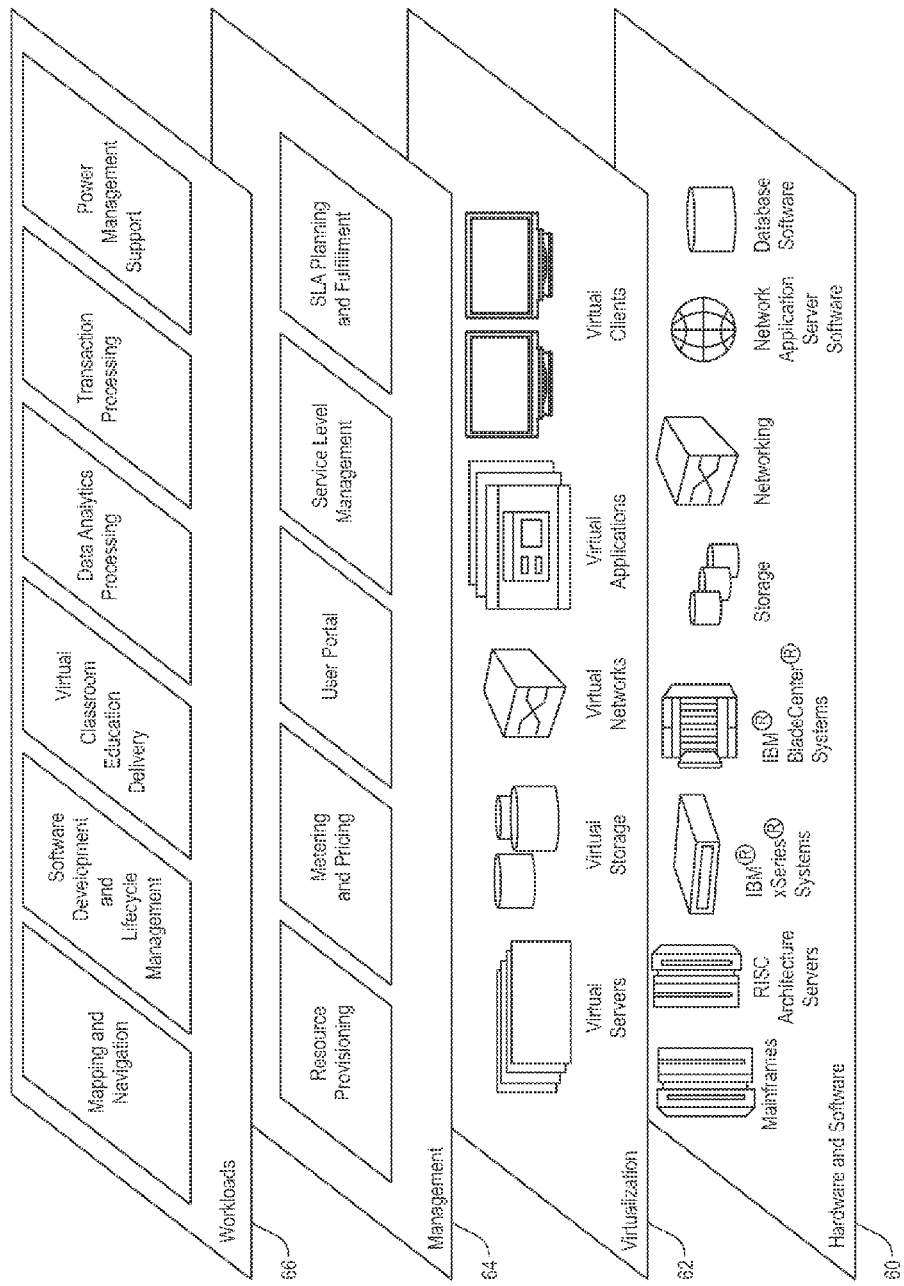
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and maintenance of data processing prioritization to support power management within the cloud computing environment.

In the shared pool of configurable computer resources described herein, hereinafter referred to as a cloud computing environment, files may be shared among users within multiple data centers, also referred to herein as data sites. There is a challenge associated with achieving efficient and on-demand energy savings at the data site. More specifically, current models of power management do not address real-time techniques that account for mitigation of performance impact on data processing. The following is a description of data storage and one or more tools to support real-time power management of storage elements. Data storage units are categorized into two tiers, including disk arrays and volumes. A disk array is a physical group of volumes. In one embodiment, the disk array is labeled with the priority of its highest priority volume, wherein a volume is a data storage device. A computer recognizes all data storage devices as volumes. In one embodiment, each volume has an associated file system recognizable by the computer and also has an associated priority. A control system uses a demand response heuristic to determine to which system component to send control commands to the two tiers of storage units to trigger corresponding on-demand power capping capabilities. More specifically, energy consumption of a disk array or volume is reduced on a temporary basis while minimizing performance impact, and without migrating data or denying data access. The demand response heuristic uses power and performance measurements as input and refers to a set of performance and power models to predict the impact of control commands. To compensate for inaccuracy in the models, a feedback driven control loop is employed.

There are two categories of data storage facilities, including a volume based facility and a disk array based facility. The act of throttling slows down selected I/O streams. More specifically, energy savings may be achieved by slowing down the rate at which the volume processes an I/O stream. A volume based facility is known to limited input and output (I/O) rates of chosen volumes to reduce the intensity of a machine workload measured in I/O operations per second (IOPS). This intensity reduction generally results in reducing energy consumption of the disk arrays in which these volumes reside. A per-volume throttling of I/O supports fine grained and continuous control that enables a search for an optimal amount of throttling such that the sum of a resulting power savings meets a set target. The disk array based facility allows selected disk arrays to enter a low power state with associated recovery latency. In one embodiment, the disk array is labeled with the priority of its highest priority volume. Through use of the volume and disk array based storage facilities, the goal is to decide which volumes to throttle and which disk arrays to switch to low power state such that the demand response power target is met while the performance loss of high priority data access is minimized. Accordingly, power savings is achieved with respect to data storage on one or both of the volume and the disk array through throttling and adjustment of the power state, respectively.

Figure 4:
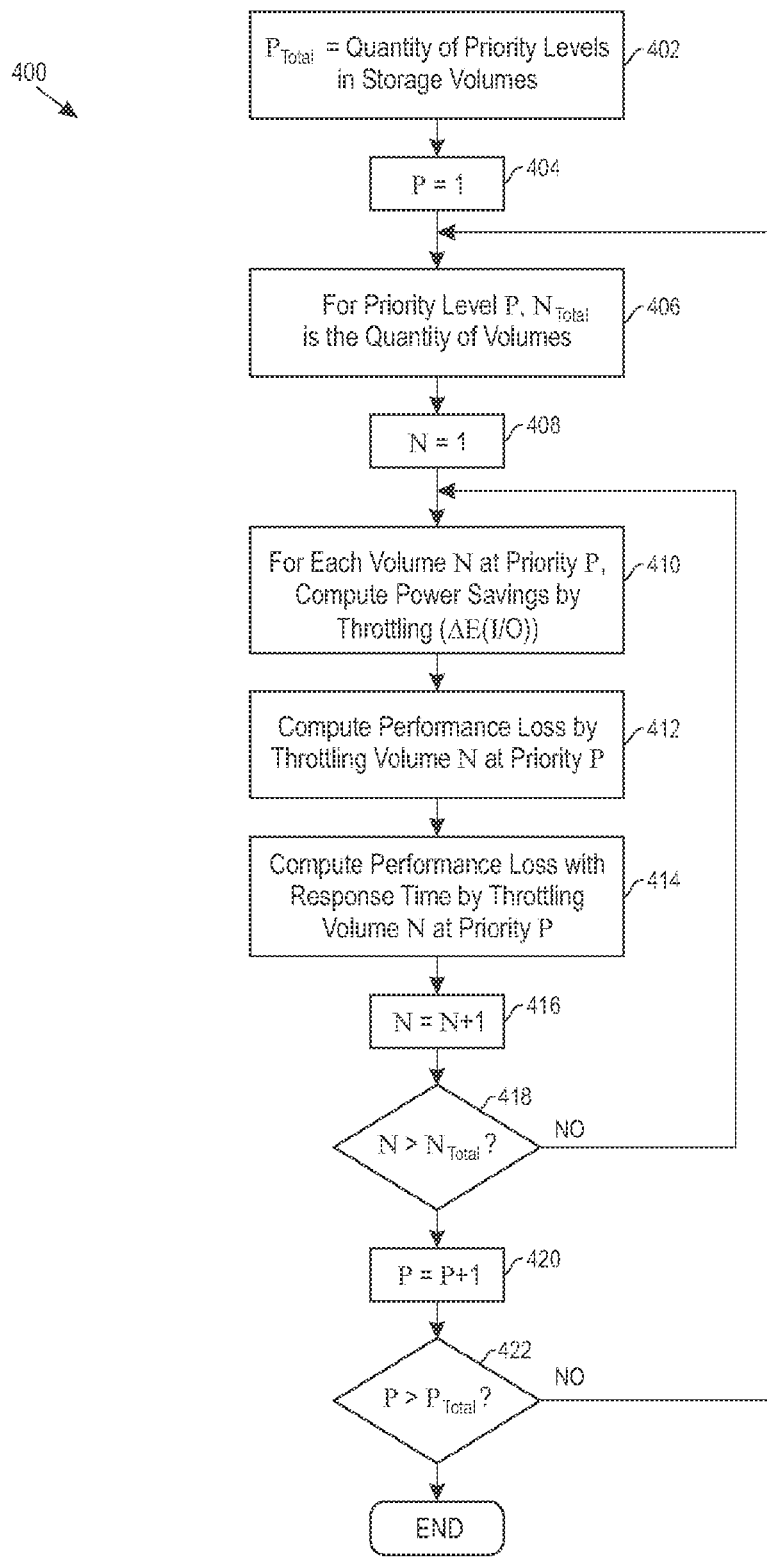
FIG. 4 depicts a flow chart illustrating a process for throttling a volume within data storage.

FIG. 4 is a flow chart (400) illustrating a process for throttling a volume within data storage. Specifically, the data storage may include one or more volumes of storage media, with each volume assigned a respective priority level. In one embodiment, the priority level is associated with the relative importance of operability of the volume with respect to other volumes in data storage. The variable $P_{Total}$ is assigned to the quantity of priority levels identified in the volumes (402), and the counting variable P for each priority level is assigned to the integer one (404). For priority level P, the variable $N_{Total}$ is assigned to the quantity of volumes at priority level P (406), and the counting variable N for each volume at priority P is assigned to the integer one (408). For each volume N at priority P, the power savings by throttling volume N is computed (410). In one embodiment, power savings, E (TO) is achieved by throttling the volume N until its IO per second reaches a minimal utilization permitted by an associated policy. At the same time, the performance loss by throttling volume N at priority P is computed (412), and the performance loss in terms of the change in response time by throttling volume N at priority P is computed (414). The performance being monitored can include, but is not limited to, response time and throughput. As shown at step (412), performance loss is calculated in terms of throughput as the change in IO. Similarly, as demonstrated at step (414), performance loss can be computed as a change in response time, RT.

Following step (414), the variable N, representing the quantity of volumes at priority level P, is incremented (416). It is then determined if there are additional volumes at priority P to be evaluated (418). A negative response to the determination at step (418) is followed by a return to step (410). Conversely, a positive response to the determination at step (418) is followed by an increment of the variable P (420), with P representing the priority level subject to evaluation. A second determination then takes place to ascertain if there are additional priority levels and volumes assigned to such levels that need to be evaluated (422). A negative response to the determination at step (422) is followed by a return to step (406), and a positive response to the determination at step (422) concludes the calculation of the power savings, performance loss, and power gain associated with throttling individual storage volumes. Accordingly, for each volume and each priority level, the power savings, performance loss and response time savings may be calculated.

Figure 5:
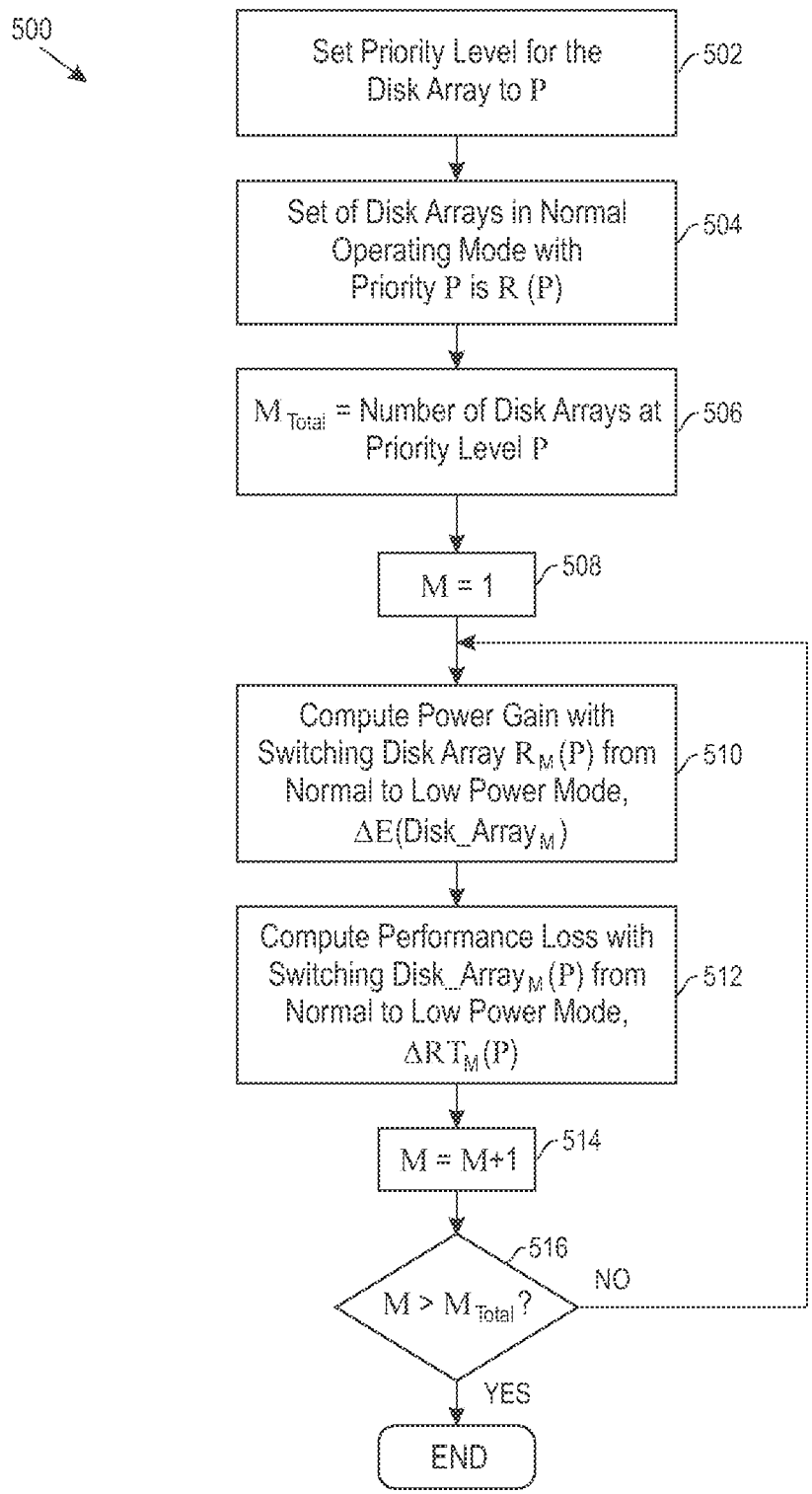
FIG. 5 depicts a flow chart illustrating a process for computing both power gain and performance loss on switching the power state of a disk array.

As explained above, a disk array is a physical group of volumes wherein an entire disk array, and the volumes encompassed therein, may be placed in a low power state to provide energy savings. However, such savings do have a price. FIG. 5 is a flow chart (500) illustrating the process of computing both power gain and performance loss on switching the power state of a disk array. A priority level for the disk array is set to priority level P (502). The set of disk arrays in normal operating state with priority level P is represented as R(P) (504), the variable $M_{Total}$ is assigned to the quantity of disk arrays at priority level P (506), and a counting variable M is set to the integer one (508). The power gain associated with switching the disk array $R_M(P)$ from normal to a low power state is computed (510). In one embodiment, the power gain or change of power is represented as $\Delta E$ (Disk Array$_M$). Additionally, the performance loss, $\Delta RT_M(P)$, with switching the disk array $R_M(P)$ from normal to a low power state is computed (512). Following the computations at steps (510) and (512), the variable M is incremented (514), and it is then determined if each of the disk arrays at priority level P have been evaluated (516). A negative response to the determination at step (516) is followed by a return to step (510). Conversely, a positive response to the determination at step (516) concludes the power gain and performance loss computations. Accordingly, for each disk array at a set priority level, the power gain and performance loss may be calculated.

As stated above, the goal of the calculation is to determine which volumes to throttle and which disk arrays to place in a low power state, all the while mitigating performance degradation. The following is pseudo code for selection of a volume or disk arrays for throttling or placing in a low power state, respectively:

For each volume:
 Calculate energy gain efficiency per IO per second sacrificed on a disk array basis and a volume basis. For the disk array basis, calculate the ratio of $\Delta E$ (disk array)/$\Delta IO$, or energy gain efficiency per IO per second sacrificed. For the volume basis, calculate the ratio of $\Delta E$ (volume)/$\Delta IO$, where $\Delta IO$ is the change in the rate of IO per second;
 Calculate response time sacrificed on a disk array basis and a volume basis. For the disk array basis, calculate the ratio of $\Delta E$ (disk array)/$\Delta RT$ (disk array). For the volume basis, calculated the ratio of $\Delta E$ (volume)/$\Delta RT$ (volume).
 If a volume, V, is selected:
  Update volume, V, as to be throttled;
  $\Delta E = \Delta E + \Delta E$ (volume);
 Else, if a disk array, R, is selected:
  Update disk array R, as to be throttled;
  $\Delta E = \Delta E + \Delta E$ (disk array);
Accordingly, as demonstrated, a value may be attached to the energy savings.

Both the volumes and disk arrays may be manipulated to meet energy savings goals. The energy savings goal may be a long term commitment or a short term commitment. Once the demand response has reached the end of the term, power may be restored to all disk arrays placed in a lowered power state. Similarly, the throttling may be removed from all volumes affected by the throttling. Accordingly, the adjustments imposed on the hardware to attain the power savings may be for a limited period of time, followed by restoration of power.

It is recognized that there may be inaccuracy associated with a shift in workload characteristics after the described low powering actions have taken place. Volumes selected for throttling, or disk arrays selected for throttling of volumes and/or a lowered power state may yield a greater savings than anticipated or not enough savings. To address this limitation, a feedback control loop is employed where energy savings adjustments on the volumes and/or disk arrays are measured with respect to the energy savings goals.

Figure 6:
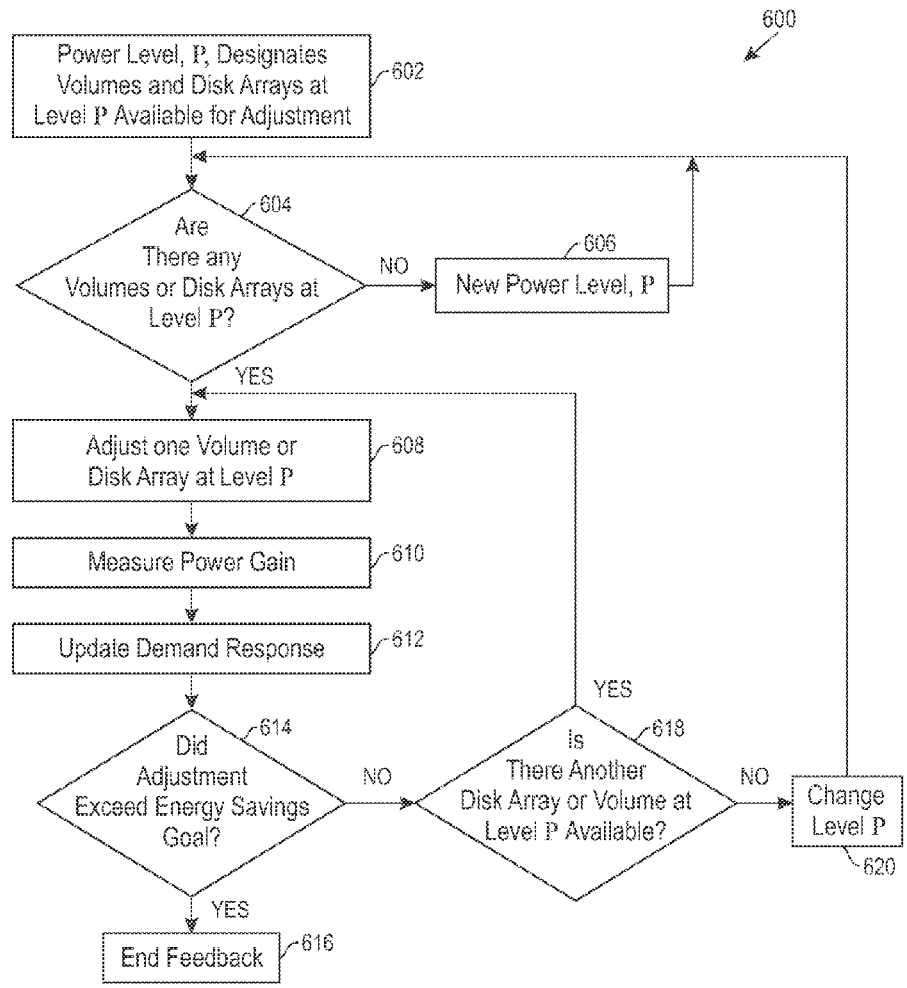
FIG. 6 depicts a flow chart illustrating a feedback control loop for management of volume(s) and/or disk array(s).

FIG. 6 is a flow chart (600) illustrating a feedback control loop for management of volume(s) and/or disk array(s). As shown, a power level, P, is set to designate volumes and disk arrays operating at this level as being available for adjustment (602). It is then determined if there are any volumes or disk arrays available at power level P (604). A negative response to the determination at step (604) is followed by a new power level designation (606) followed by a return to step (604). Conversely, a positive response to the determination at step (604) is following by adjusting one volume or disk array at power level P (608), measuring the associated power gain in response to the adjustment (610), and updating the demand response (612). Accordingly, each adjustment, also referred to herein as an iteration, is followed by an update of the demand response of the system.

Following step (612), it is determined if the adjustment at step (608) exceeded the energy savings goal (614). A positive response to the determination at step (614) is following by termination of the feedback heuristic (616). Conversely, a negative response to the determination at step (614) is followed by determining if there is another disk array or volume at priority P that is available for adjustment (618). A positive response to the determination at step (618) is followed by a return to step (608), and a negative response is followed by changing the power level P (620) followed by a return to step (604). Accordingly, the phased heuristic shown herein provides an opportunity to obtain power consumption feedback after some volumes or disk array have been throttled or low powered, respectively, and further volume and disk array adjustments may be made according to the feedback.

Although not reflected in the figures shown herein, the demand to address energy savings may be based upon time duration. Once the time duration has passed, the limits on all the volumes may be removed and power may be restored to all disk arrays that were placed in a low power state.

EXAMPLE

The following is an example of a system with two disk arrays and two volumes in each disk array. Disk array$_1$ has Volume$_1$ and Volume$_2$, and Disk array$_2$ has Volume$_3$ and Volume$_4$. Volume$_1$ has a priority level of one, an IOPS rate of 150, and a minimum IOPS rate of 25. Volume$_2$ has a priority level of 3, an IOPS rate of 50, and a minimum IOPS rate of 25. Volume$_3$ has a priority level of 3, an IOPS rate of 150, and a minimum IOPS rate of 25. Volume$_4$ has a priority level of 4, an IOPS rate of 50, and a minimum IOPS rate of 25. Both disk arrays have the same power model. The energy savings, $\Delta E$, goals is 10 watts, and the priority level P is set to 4. Only Volume$_4$ is eligible for throttling at this priority level, and no disk array is eligible for low powering at this priority level. Volume$_4$ is throttled and $\Delta E$ is assessed at 0.5 Watts, which is less than the goal of 5 Watts. Next, the priority level is changed to 3. Volume$_2$ and Volume$_3$ both have a priority level of 3, as does Disk array$_2$. Low powering Disk array$_2$ yield a power gain of 4 Watts and has no IOPS loss. Therefore Disk array$_2$ is low-powered, which yields a total energy savings, $\Delta E$, of 4.5 Watts, which is still less than the goal. However, at priority level 3, two volumes are eligible for throttling, Volume$_2$ and Volume$_3$. Volume$_2$ yields 2 Watts of energy savings at the expense of 50 IOPS and Volume$_3$ yields 1 Watt of energy savings at the expense of 100 IOPS. Accordingly, Volume$_2$ is throttled, yielding an energy savings, $\Delta E$, of 6.5 Watts, which is greater than the goal.

Figure 7:
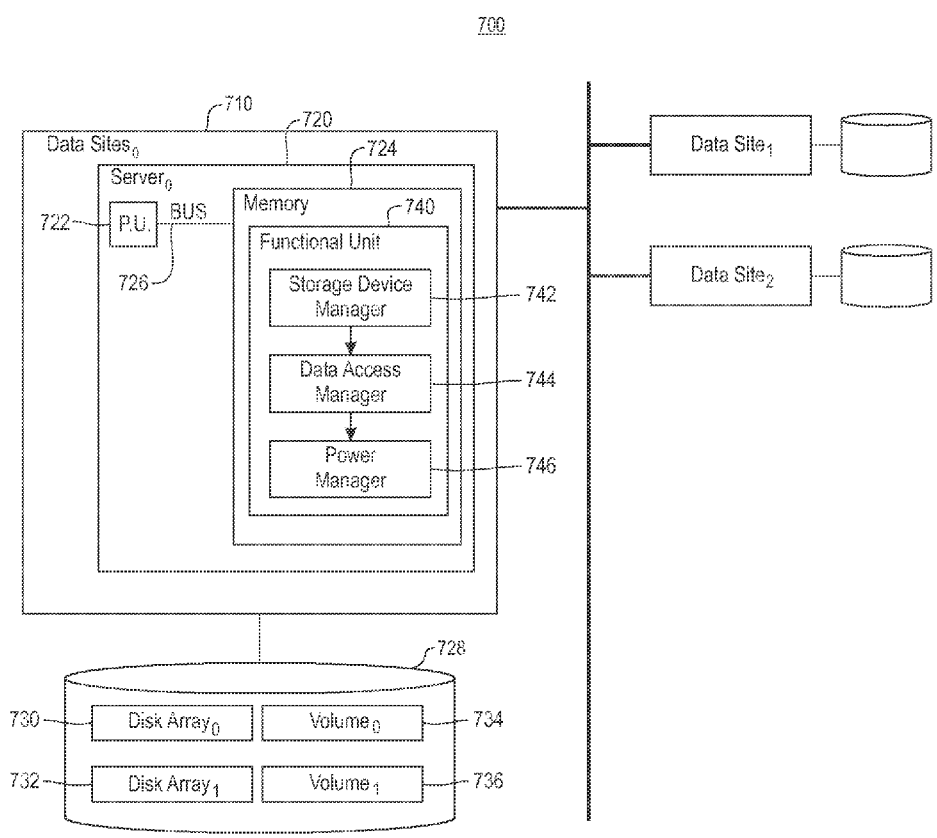
FIG. 7 depicts a block diagram illustrating tools embedded in a computer system to support dynamic power management of disk arrays and/or volumes within a data site.

As demonstrated in the flow charts of FIGS. 1-6 and the associated example, a method is employed to support on-demand power reduction within storage subsystems of a data site. The power to the volumes and/or disk arrays in the data site is dynamically adjusted on a temporary basis to provide a balanced energy reduction while minimized overall performance impact on the storage subsystems. FIG. 7 is a block diagram (700) illustrating tools embedded in a computer system to support dynamic power management of disk arrays and/or volumes within a data site. A shared pool of configurable computer resources is shown local to a first data site (710). Although only one data site is shown in the example herein, the invention should not be limited to a single data site and may be expanded to include a plurality of data sites. The data site (710) is provided with at least one server (720) in communication with data storage (728). The server (720) has a processing unit (722), in communication with memory (724) across a bus (726), and in communication with data storage (728). As shown herein, data storage (728) includes two disk arrays (730) and (732), and two storage volumes (734) and (736). In one embodiment, the quantity of disk arrays and storage volumes may differ, and as such, the invention should not be limited to the quantity shown herein.

In the example shown herein, a functional unit (740) is provided local to the server (720) and in communication with the data storage (728) to manage power consumption of the storage entities (730)-(736). More specifically, the functional unit (740) has tools in the form of managers to support power management within the data storage (728). The tools include, but are not limited to, a storage device manager (742), a data access manager (744), and a power manager (746). The storage device manager (742) is provided to monitor and report power consumption of the physical storage devices in data storage (728). The data access manager (744) is provided to monitor and report data access performance with respect to each of the physical storage devices in data storage (728) and to store policies pertaining to the storage devices (728). The stored policies include, but are not limited to priorities, response time targets, and throughput targets. The power manager (746) is provided in communication with both the storage device manager (742) and the data access manager (744). The power manager (746) is responsible for receiving reporting data from both the storage device manager (742) and the data access manager (744) and employing heuristics in real-time to mitigate power consumption by the storage devices. More specifically, in response to a request or another form of communication indicating a requirement to reduce power consumption, the power manager (746) both lowers power usage while maintaining performance of the data storage in compliance with stored performance policies. Accordingly, the managers (742)-(746) of the functional unit (740)

address power management of storage elements while addressing performance policies.

Two heuristics are provided to support the goals and functionality of the power manager (746). A first heuristic organizes the storage devices in a hierarchy, with the arrangement including both disk arrays and volumes. The first heuristic selects one of the devices in the arrangement and lowers a power consumption setting based upon a priority setting thereof. A second heuristic measures a power consumption feedback following the lowering of the power consumption setting of the selected storage device. More specifically, the second heuristic makes adjustment to a selection of the storage devices according to the measured feedback.

As described above, there are two methods of managing power output from the storage devices as directed by the power manager (746), including throttling, i.e. reducing, I/O rates to one or more storage volumes, and placing a disk array in a low power state. In one embodiment, the power management may concurrently execute both methods, meaning lowering a power state of a disk array while throttling a volume. The management of the power consumption of the storage elements is conducted in a dynamic manner. In one embodiment, the power consumption is adjusted on a temporary basis in an effort to minimize overall performance impact originating from the storage elements. For example, once the request to limit power has elapsed, the power manager (746) may remove the power consumption limitations on the volumes and/or disk arrays. As discussed above, the data storage elements are arranged in a hierarchy. The heuristics employed by the power manager (746) address power consumption adjustment in order of priority. More specifically, those volumes and/or arrays with a low priority setting are adjusted before volumes and/or arrays with a higher priority setting. Accordingly, by making the adjustments responsive to the hierarchy, power savings is attained while mitigating impact on read and write transactions to the data storage.

Power consumption and associated management of storage elements are supported by the storage device manager (742), data access manager (744), and power manager (746) of the functional unit (740). In one embodiment, the managers are provided in the shared pool of configurable computer resources, i.e. cloud, to arrange the data elements in a hierarchy and to throttle one or more storage volumes and/or place one or more disk arrays into a lower power state responsive to both the hierarchy and the power management requirements. The storage device manager (742), data access manager (744), and power manager (746) of the functional unit (740) are shown residing in memory (724) of the server (720) local to the first data site (710). Although in one embodiment, the managers may reside as hardware tools external to memory (724), or they may be implemented as a combination of hardware and software. Similarly, in one embodiment, the managers may be combined into a single functional item that incorporates the functionality of the separate items. As shown herein, each of the manager(s) is shown local to one data site. However, in one embodiment they may be collectively or individually distributed across a shared pool of configurable computer resources and function as a unit to manage creation of identical consistency points in two different file systems. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote or separate computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
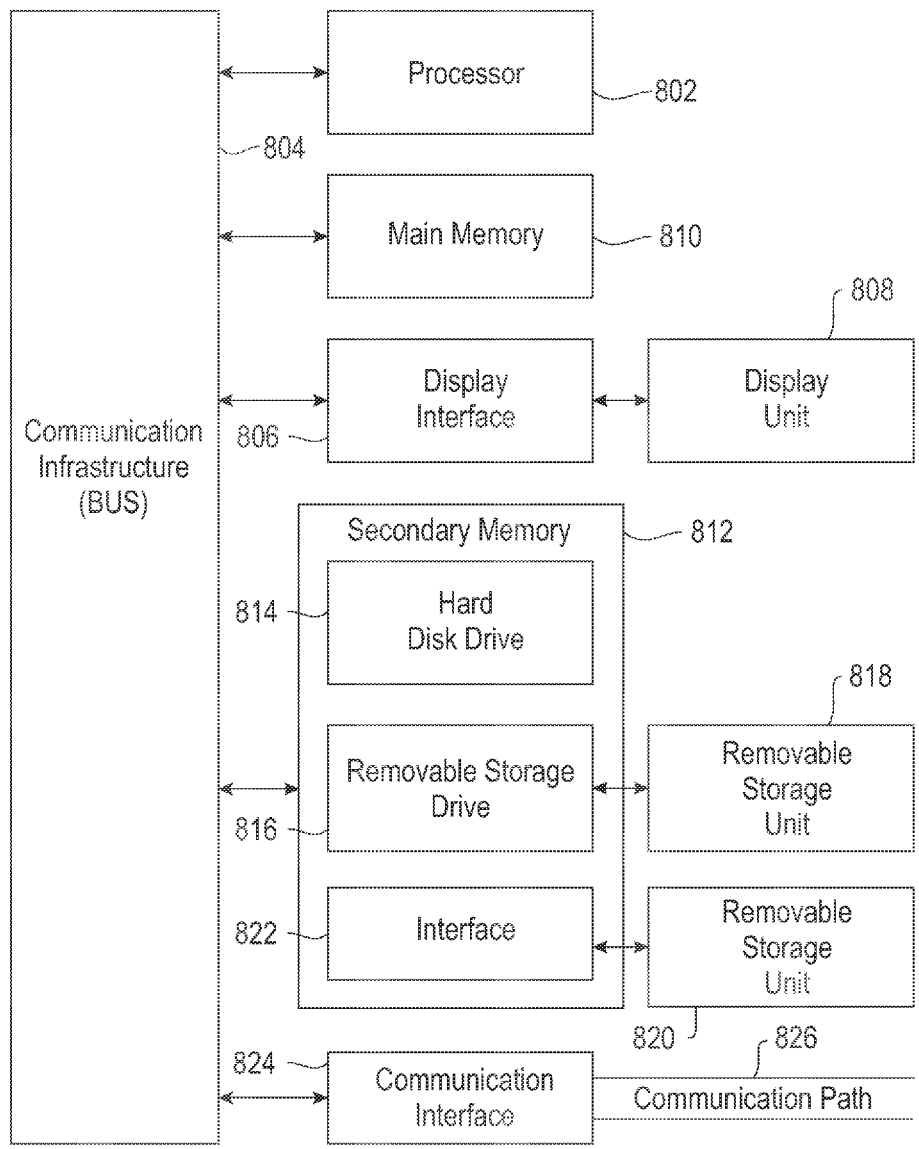
FIG. 8 depicts a block diagram showing a system for implementing an embodiment of the present invention.

Referring now to FIG. 8 is a block diagram (800) showing a system for implementing an embodiment of the present invention. The computer system includes one or more processors, such as a processor (802). The processor (802) is connected to a communication infrastructure (804) (e.g., a communications bus, cross-over bar, or network). The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) are in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present invention as discussed herein. In particular, the computer programs, when run, enable the processor (802) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured to monitor and report power consumption of one or more processing units in communication with the monitored physical storage devices. Responsive to lowering a power consumption setting of a physical storage device, the processing unit in communication with the physical storage device may also have an associated power consumption setting lowered. In one embodiment, the placement of the processing unit into a lowered power consumption setting may be in response to the measured power consumption feedback and the requirement to further lower the power consumption associated with the physical storage devices. Accordingly, the scope of protection of this invention is limited only by the following claims and their equivalents.

We claim:

1. A system comprising:
a storage subsystem of a data site having multiple storage devices, the devices organized into a hierarchy comprised of at least one disk array and at least one volume;
a functional unit in communication with the storage subsystem, the functional unit comprising:
a storage device manager to monitor and report power consumption of the storage devices;
a data access manager to monitor and report data access performance on each of the storage devices, including the data access manager to store policies of the storage devices;
a power manager in communication with the storage device manager and the data access manager to receive the reports, the power manager to employ real-time heuristics to lower power usage of at least one storage device in the subsystem by at least a required amount in response to a request to limit power while maintaining performance responsive to the stored policies, the heuristics comprising:
a first heuristic to select one of the devices in one of a selection of tiers in the hierarchy based upon a priority setting, wherein the priority setting includes importance of operability of the selected device, and to lower a power consumption setting of the selected device; and
a second heuristic to measure power consumption feedback after the first heuristic lowers the power consumption setting of the selected device based upon the priority setting, and the second heuristic to adjust selection of the devices according to the measured feedback, wherein availability of a device for power consumption setting adjustment is evaluated in the selected tier prior to inter-tier selection of a third device.

2. The system of claim 1, wherein the first and second heuristics dynamically manage power consumption, including temporarily reducing energy consumption of a storage subsystem while minimizing overall performance impact.

3. The system of claim 2, further comprising the first and second heuristics to reduce energy consumption by manipulating operation of the storage devices, wherein the manipulation is selected from the group consisting of: throttling an I/O rate to a low important volume, placing the disk array into a low power state, and combinations thereof.

4. The system of claim 2, further comprising the power manager to remove any power consumption limitations on all volumes and disk arrays in the hierarchy when the request to limit power has elapsed.

5. The system of claim 1, further comprising the first and second heuristics to throttle storage volumes in order of priority from a low priority setting to achieve power savings.

6. The system of claim 1, wherein the storage subsystem of the data site is a shared pool of configurable resources.

7. A non-transitory computer program product for use with a storage subsystem of a data site having multiple storage devices organized in a hierarchy comprised of at least one disk array and at least one volume, the computer program product comprising a computer readable storage medium having computer readable program code embodied thereon, which when executed causes a computer to implement the method comprising:
monitoring and reporting power consumption of the storage devices;
monitoring and reporting data access performance on each of the storage devices;
in response to a request to limit power, employing real-time heuristics receive the reporting and to lower power usage by at least a required amount of at least one storage device in the subsystem while maintaining performance based upon stored policies, the heuristics comprising:
selecting one of the devices in one of a selection of tiers in the hierarchy based upon a priority setting, wherein the priority setting includes importance of operability of the selected device, and lowering a power consumption setting of the selected device; and
measuring power consumption feedback after lowering the power consumption setting of the selected device based upon the priority setting and adjusting selection of the devices according to the measured feedback, wherein the availability of a device for power consumption setting adjustment is evaluated in the selected tier prior to inter-tier selection of a third device.

8. The computer program product of claim 7, further comprising dynamic management of power consumption, including temporarily reducing energy consumption of a storage subsystem while minimizing overall performance impact.

9. The computer program product of claim 8, further comprising reducing energy consumption by manipulating operation of the storage devices.

10. The computer program product of claim 9, wherein the manipulation is selected from the group consisting of: throttling I/O rates to a low important volume in the hierarchy, placing the disk array into a low power state, and combinations thereof.

11. The computer program product of claim 8, further comprising removing power consumption limitation on all volumes and disk arrays in the hierarchy after the request to limit power has elapsed.

12. The computer program product of claim 7, further comprising the heuristics throttling volumes in order of priority from a low priority setting to achieve power savings.

13. The computer program product of claim 7, wherein the storage subsystem of the data site is a shared pool of configurable resources.

* * * * *